(12) United States Patent
Lin et al.

(10) Patent No.: US 11,848,532 B2
(45) Date of Patent: Dec. 19, 2023

(54) ACOUSTO-OPTIC Q SWITCH, RESONANT CAVITY AND PULSE LASER DEVICE FOR IMPROVING LASER DEVICE POWER

(71) Applicants: INSTITUTE OF SEMICONDUCTORS, CHINESE ACADEMY OF SCIENCES, Beijing (CN); CHANGSHA AERONAUTICAL VOCATIONAL AND TECHNICAL COLLEGE, Changsha (CN)

(72) Inventors: Xuechun Lin, Beijing (CN); Zhiyan Zhang, Beijing (CN); Haijun Yu, Beijing (CN); Houwang Zhu, Changsha (CN); Quansheng Zeng, Changsha (CN); Zhiyong Dong, Beijing (CN); Hongyang Wang, Beijing (CN); Hao Liang, Beijing (CN)

(73) Assignee: INSTITUTE OF SEMICONDUCTORS, CHINESE ACADEMY OF SCIENCES, Beijing (CN)

( * ) Notice: Subject to any disclaimer, the term of this patent is extended or adjusted under 35 U.S.C. 154(b) by 379 days.

(21) Appl. No.: 17/123,492

(22) Filed: Dec. 16, 2020

(65) Prior Publication Data
US 2021/0194204 A1    Jun. 24, 2021

(30) Foreign Application Priority Data
Dec. 20, 2019 (CN) .......................... 201911334588.3

(51) Int. Cl.
*H01S 3/11* (2023.01)
*H01S 3/117* (2006.01)

(52) U.S. Cl.
CPC .................................. *H01S 3/117* (2013.01)

(58) Field of Classification Search
CPC ........................... H01S 3/117; H01S 3/08072
See application file for complete search history.

(56) References Cited

U.S. PATENT DOCUMENTS

| 3,613,024 A * | 10/1971 | Geusic | H01S 3/117 |
| | | | 372/13 |
| 3,860,752 A * | 1/1975 | Adler | G02B 26/105 |
| | | | 348/754 |
| 5,268,911 A * | 12/1993 | Young | H01S 3/117 |
| | | | 372/27 |
| 2009/0147344 A1 * | 6/2009 | Lovering | H01S 3/117 |
| | | | 372/13 |

(Continued)

FOREIGN PATENT DOCUMENTS

CN         101854025      * 10/2010

*Primary Examiner* — Michael Carter
(74) *Attorney, Agent, or Firm* — Christopher R. Christenson; Kelly, Hok & Christenson, P.L.L.C

(57) ABSTRACT

An acousto-optic Q switch, a resonant cavity, and a pulse laser device for improving laser device power. The acousto-optic Q switch includes: a transparent optical element configured to form a phase grating that diffracts laser; a piezo-electric transducer arranged at one end of the transparent optical element and configured to convert electrical energy into ultrasonic energy to form the phase grating in the transparent optical element; and an absorber arranged at the other end of the transparent optical element to absorb the ultrasonic energy.

10 Claims, 4 Drawing Sheets

(56) References Cited

U.S. PATENT DOCUMENTS

2009/0232167 A1* 9/2009 Seguin .................... H01S 3/117
                                                          372/13
2019/0001442 A1* 1/2019 Unrath ................. B23K 26/082

* cited by examiner

ACOUSTO-OPTIC Q SWITCH, RESONANT CAVITY AND PULSE LASER DEVICE FOR IMPROVING LASER DEVICE POWER

CROSS-REFERENCE TO RELATED APPLICATION

This application claims a benefit of Chinese Patent Application No. 201911334588.3 filed with China National Intellectual Property Administration on Dec. 20, 2019, the whole disclosure of which is incorporated herein by reference.

TECHNICAL FIELD

The present disclosure relates to a field of high-power pulse laser, and in particular to an acousto-optic Q switch, a resonant cavity, and a pulse laser device for improving laser device power.

BACKGROUND

The use of acousto-optic Q switch technology to achieve pulse laser output is a common method in a field of pulse laser technology. With increasing demand for laser processing efficiency in an industrial production field, improving an output power of pulse laser devices is currently one of the main research contents in the field of pulse laser technology. Generally, a high-power pulse laser device consists of an oscillation stage and an amplifier stage. Increasing a power of pulsed laser output by the oscillation stage may effectively increase overall output power of the laser device. The main reasons are: 1. the high-power oscillation stage laser may improve an extraction efficiency of the amplifier stage and may output higher laser power under same number of the amplifier stages; 2. the use of a high-power oscillation stage may reduce a number of amplifier stages, make the structure simple, and improve the reliability of the laser device. However, usually a power of oscillation stage pulse laser output by using the acousto-optic Q-switched technology is only tens of watts to hundreds of watts, and then increasing the power of the oscillation stage laser may cause the acousto-optic Q to not be completely turn-off, resulting in continuous laser output from the oscillation stage, thereby reducing an application performance of the laser device. One of the reasons that the high-power laser cannot be turned off completely is: usually due to an uneven heat distribution inside a gain medium, the oscillation stage light beam have a focused distribution with varying curvature, resulting in an angle formed between the beam passing through the acousto-optic crystal and phase gratings inside the acousto-optic crystal does not completely satisfy a Bragg angle, thereby resulting in a decrease in the acousto-optic Q turn-off capability; and as a beam inside a resonant cavity is a focused beam, a volume of the beam inside the crystal becomes smaller, therefore optimizing and increasing the volume of the focused beam inside the acousto-optic crystal and increasing a number of gratings passing through the laser beam may achieve a purpose of improving the turn-off capability.

SUMMARY

In view of this, one of the main objectives of the present disclosure is to provide an acousto-optic Q switch, a resonant cavity and a pulse laser device for improving laser device power, in order to at least partially solve at least one of the above technical problems.

In order to achieve the above objective, as an aspect of the present disclosure, an acousto-optic Q switch for increasing the laser device power is provided, including: a transparent optical element configured to form a phase grating that diffracts laser; a piezoelectric transducer arranged at one end of the transparent optical element and configured to convert electrical energy into ultrasonic energy to form the phase grating in the transparent optical element; and an absorber arranged at the other end of the transparent optical element to absorb the ultrasonic energy.

As another aspect of the present disclosure, a resonant cavity is also provided, including: a laser module configured to generate a pump laser; a high-reflection mirror reflecting an oscillating laser inside the resonant cavity back to a gain crystal inside the laser module; an acousto-optic Q switch described above which is configured to turn off an oscillation stage laser; and an output mirror configured to reflect the oscillating laser inside the resonant cavity back to the gain crystal inside the laser module and output a part of the laser.

As another aspect of the present disclosure, there is also provided a pulse laser device including the acousto-optic Q switch described above or the resonant cavity described above.

Based on the above technical solutions, it can be known that the acousto-optic Q switch, the resonant cavity and the pulse laser device of the present disclosure for improving laser device power has at least one of the following advantages over the related art.

1. The incident surface of an optical crystal inside the acousto-optic Q is designed as a concave curved surface, which may expand the focused beam that oscillates inside the resonant cavity, so that a volume of the beam passing through the acousto-optic Q optical crystal becomes larger, and a purpose of improving a number of the gratings passing through the oscillating beam is indirectly achieved. Since the ability of the acousto-optic Q to turn off the oscillation stage laser is proportional to the number of gratings passing through the laser beam, the present disclosure may improve the ability of the acousto-optic Q switch to turn off the oscillation stage laser.

2. The incident surface of the optical crystal inside the acousto-optic Q is designed as a concave curved surface, which may shape the focused beam that oscillates inside the resonant cavity, so that the beam inside the acousto-optic Q optical crystal becomes a collimated parallel beam or close to a parallel beam. It may homogenize an included angle between the beam passing through the acousto-optic Q optical crystal and each Bragg diffraction grating formed inside the acousto-optic Q optical crystal, so that included angles of the beam propagating inside the acousto-optic Q optical crystal are equal or approximately equal, and equal to the Bragg diffraction angle, which may improve the ability of the acousto-optic Q switch to turn off the oscillation stage laser.

3. The exit surface of the acousto-optic Q optical crystal is designed as a convex curved surface opposite to the incident surface, and the convex curved surface of the exit surface of the optical crystal has a same curvature as the concave curved surface of the incident surface of the optical crystal. When the acousto-optic Q is in an on state and the pulsed laser is output, the output surface may reshape and restore the oscillating beam passing through the acousto-optic Q optical crystal to restore to a size of the laser beam before entering the acousto-optic Q optical crystal. In this way, after the incident surface and the exit surface of the acousto-optic Q switch crystal are designed to be curved surfaces, diameters of the oscillating beams inside the laser device resonant cavity are not changed, and the stability of the overall resonant cavity is not affected, which is the same as an original resonant cavity.

DESCRIPTION OF REFERENCE SIGNS

Figure 1:
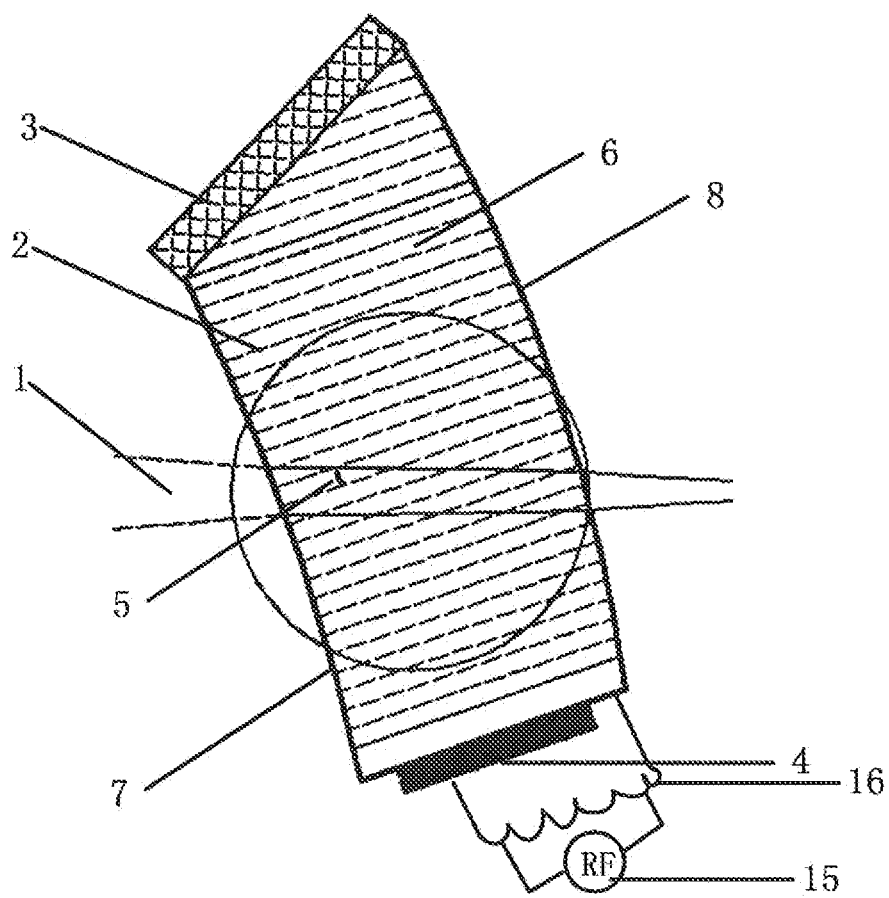
FIG. 1 is a schematic structural diagram of an acousto-optic Q switch according to an embodiment of the present disclosure.

1—laser beam; 2—phase grating; 3—absorber; 4—piezoelectric transducer; 5—included angle; 6—fused silica crystal; 7—incident surface; 8—exit surface; 9—parallel beam; 10—high-reflection mirror; 11—output mirror; 12—laser module; 13—acousto-optic Q switch; 14—gain dielectric crystal; 15—inductance matching network; 16—radio frequency generator.

DETAILED DESCRIPTION OF EMBODIMENTS

In order to make the objectives, technical solutions and advantages of the present disclosure clearer, the present disclosure will be further described in detail below in conjunction with specific embodiments and with reference to the accompanying drawings.

The present disclosure discloses an acousto-optic Q switch, comprising: a transparent optical element configured to form a phase grating that diffracts laser; a piezoelectric transducer arranged at one end of the transparent optical element and configured to convert electrical energy into ultrasonic energy to form the phase grating in the transparent optical element; and an absorber arranged at the other end of the transparent optical element to absorb the ultrasonic energy.

In some embodiments of the present disclosure, an incident surface of the transparent optical element is an arc-shaped curved surface; an exit surface of the transparent optical element is an arc-shaped curved surface.

In some embodiments of the present disclosure, a curvature of each position of the arc-shaped curved surface of the transparent optical element is a constant value or a variable value designed according to a change of the curvature of the incident focused beam.

In some embodiments of the present disclosure, a radius of curvature of the incident surface is same as a radius of curvature of the exit surface; and a sphere center of the incident surface and a sphere center of the exit surface are located on a same side.

In some embodiments of the present disclosure, material used for the transparent optical element comprises fused silica crystal, lithium niobate, lead molybdate, tellurium dioxide, and heavy flint glass.

In some embodiments of the present disclosure, the acousto-optic Q switch further comprises: a cooling unit configured to cool the absorber.

In some embodiments of the present disclosure, the cooling unit comprises a fan or cooling water.

The present disclosure also discloses a resonant cavity, comprising: a laser module configured to generate laser; a high-reflection mirror reflecting an oscillating laser inside the resonant cavity back to a gain crystal inside the laser module; an acousto-optic Q switch described above, and the acousto-optic Q switch is configured to turn off the oscillation stage laser; and an output mirror configured to reflect the oscillating laser inside the resonant cavity back to the gain crystal inside the laser module and output a part of the laser.

In some embodiments of the present disclosure, a transmittance of the output mirror is 10% to 60%; wherein the acousto-optic Q switch turns off the oscillation stage laser when an included angle between a grating formed in the acousto-optic Q switch and a laser beam is a Bragg angle.

The present disclosure also discloses a pulse laser device comprising the acousto-optic Q switch described above or the resonant cavity described above.

The technical solutions of the present disclosure will be further elaborated below through specific embodiments in combination with the drawings. It should be noted that the following specific embodiments are merely illustrative, and the protection scope of the present disclosure is not limited thereto.

The present disclosure provides an acousto-optic Q-switched laser diode side-pumped all-solid-state pulse laser device, which is used to increase an output pulse laser device power of a single-oscillation stage of the acousto-optic Q-switched pulse laser, and improve capability of the acousto-optic Q-switch to turn-off laser.

As shown in FIG. 1, an acousto-optic Q switch for improving an output of high-power pulsed laser provided by the present disclosure mainly includes: a fused silica crystal 6, a piezoelectric transducer 4, and an absorber 3. The fused silica crystal 6 is used to form a phase grating 2 that diffracts laser. The piezoelectric transducer 4 is adhered to a lower end of the fused silica crystal 6 by epoxy resin, and is used to convert electrical energy into ultrasonic energy. Vacuum-deposited electrodes provide a voltage to the piezoelectric transducer 4. An inductance matching network 15 is used to couple a signal from a radio frequency generator 16 to the piezoelectric transducer 4. Ultrasonic waves generated by the piezoelectric transducer 4 are taken into the fused silica crystal 6 to periodically change a refractive index of the fused silica crystal 6 to form the phase grating 2. The absorber 3 is located at an end opposite to the piezoelectric transducer 4 and is used to absorb the ultrasonic energy. The absorber 3 is equipped with a cooling unit, which may be a fan or flowing water. In addition to the above featured structures, the fused silica crystal 6 in the present disclosure also includes an incident surface 7 located on a light-incident side of the fused silica crystal 6; and an exit surface 8 located on a light-emitting side of the fused silica crystal 6. The incident surface 7 and the exit surface 8 are both arc-shaped curved surfaces, and a sphere center of the incident surface 7 and a sphere center of the exit surface 8 are located on same side.

Figure 2:
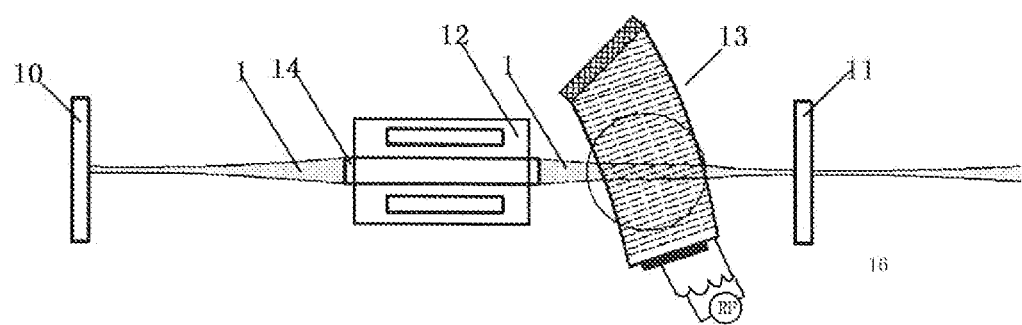
FIG. 2 is a schematic structural diagram of a laser resonant cavity in an embodiment of the present disclosure.

As shown in FIG. 2, a resonant cavity capable of outputting pulse laser mainly includes: a high-reflection mirror 10, an output mirror 11, a laser module 12, and an acousto-optic Q switch 13, and the acousto-optic Q switch 13 is an acousto-optic Q switch provided by the present disclosure that may improve laser turn-off capability. The acousto-optic Q switch 13 blocks or deflects the laser in the resonant cavity to prevent the laser from reproducing itself. By allowing a much larger number of inverted particles to be generated in a laser gain medium than in a conventional case, when a sufficient number of inverted particles is accumulated, a Q value of the resonant cavity is restored, so that the laser in the resonant cavity may reproduce itself, which may consume most of the inverted particles previously accumulated in the gain medium, and an extremely strong short-pulse laser that usually lasts tens of nanoseconds is generated. The output mirror 11 is used to reflect an oscillating laser inside the resonant cavity back to a gain crystal inside the laser module, and a part of the laser is output. Usually the output mirror is coated with a partially transparent and a partially reflective dielectric film. A transmittance of the output mirror in this embodiment is 30%.

Due to uneven thermal distribution of a gain medium crystal 14 inside the laser module 12, an intermediate temperature is high and an edge temperature is low, the laser beam 1 inside the actual resonant cavity is in a focus status, a diameter of a laser spot on an end face of the gain medium crystal 14 is the largest, and diameters of laser spots on the surfaces of the high-reflection mirror 10 and the output mirror 11 are the smallest, and the overall beam change trend is a variable curvature curve. After the light beam passes through the fused silica crystal 6 inside the acousto-optic Q switch 13, the piezoelectric transducer 4 is turned on. The piezoelectric transducer 4 converts electrical energy into ultrasonic energy, and the ultrasonic energy is taken into the fused silica crystal 6 to form a phase grating 2 inside the fused quartz crystal 6. A focused laser beam 1 is incident on the phase grating 2. When an included angle 5 between a laser propagation direction and the phase grating 2 is a Bragg angle, the focused laser beam 1 may be diffracted and deviate from the beam propagation direction, thereby destroying oscillation conditions of the resonant cavity, and realizing the turn-off of the oscillator laser. Since the incident surface of the fused silica crystal 6 inside the acousto-optic Q switch provided in the present disclosure is an arc-shaped curved surface, the included angle 5 between the focused laser beam 1 with constantly changing curvature and the phase grating 2 may be corrected to cause more included angles 5 between the incident focused laser beams 1 and the phase gratings 2 inside the fused silica crystal to satisfy the Bragg angle, which forms diffraction and completes the turn-off. Since the incident surface of the fused silica crystal 6 inside the acousto-optic Q switch is an arc-shaped curved surface 7, a beam diameter of the incident focused laser beam 1 is expanded and a number of the incident focused laser beams 1 passing through the diffraction gratings 2 inside the fused silica crystal 6 is increased, and the diffraction ability of the diffraction grating 2 to the laser is further improved, that is, the ability of the acousto-optic Q to turn off the laser is improved.

The exit surface 8 of the fused silica crystal 6 inside the acousto-optic Q switch provided by the present disclosure is an arc-shaped curved surface with exactly a same curvature as the incident surface 7. Therefore, when the acousto-optic Q switch is turned on to output a pulsed laser, that is, when no diffraction grating 2 exists inside the acousto-optic Q switch, the exit surface 8 of the fused silica crystal 6 inside the acousto-optic Q switch may focus the emitted pulse laser beam 1. Since the exit surface 8 and the incident surface 7 have exactly the same curvature, the exit surface 8 may offset a beam expansion effect of the incident surface 7 on the laser to make a final beam diameter within the overall laser oscillator unchanged and remains being an original cavity structure.

Figure 3:
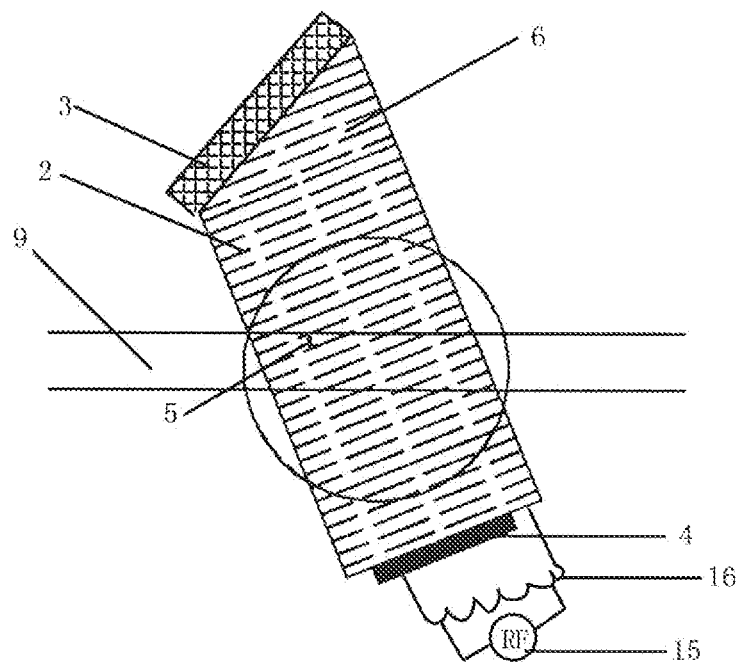
FIG. 3 is a schematic diagram of a situation that a focused beam output by a laser crystal with a thermal lens effect enters inside an ordinary acousto-optic Q crystal.

FIG. 3 shows a situation that a parallel beam 9 without any distortion enters interior of an ordinary acousto-optic Q switch. The included angle 5 between the parallel beam 9 and the diffraction grating 2 in the fused silica crystal 6 inside the acousto-optic Q switch is a constant value, so a deviation between the included angle and the Bragg angle is smallest.

Figure 4:
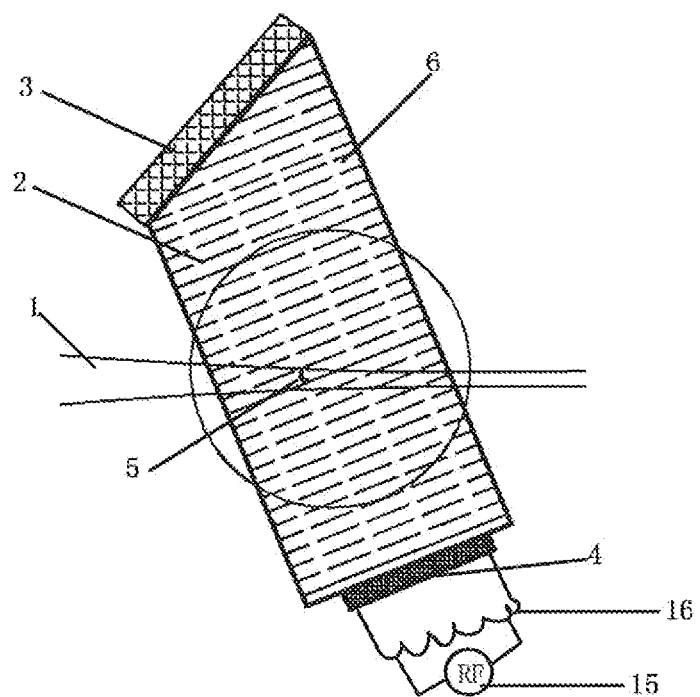
FIG. 4 is a schematic diagram of a situation that a parallel beam output by a laser crystal without a thermal lens effect enters an ordinary acousto-optic Q crystal.

FIG. 4 shows a situation that a focused beam 1 enters an ordinary acousto-optic Q switch without correction. The included angle 5 between the laser beam 1 and the diffraction grating 2 in the fused silica crystal 6 inside the acousto-optic Q switch is variable, which may reduce ability of the acousto-optic Q switch to turn off the laser.

The arc surface curvature of the incident surface 7 and the arc surface curvature of the exit surface 8 of the fused silica crystal 6 inside the acousto-optic Q switch may be a constant value, which may reduce the non-uniformity of the included angles 5 between the laser beam 1 and the diffraction grating 2 in the fused silica crystal 6 inside the acousto-optic Q switch, and improve the turn-off capability. The arc surface curvature of the incident surface 7 and the arc surface curvature of the exit surface 8 of the fused silica crystal 6 inside the acousto-optic Q switch may also be changed according to a variable curvature surface of the beam 1, which may completely eliminate the non-uniformity of the included angles 5 between the laser beam 1 and the diffraction grating 2 in the fused silica crystal 6 inside the acousto-optic Q switch, and improve the turn-off capability.

The specific embodiments described above further describe the purpose, technical solutions and beneficial effects of the present disclosure in further detail. It should be understood that the above are only specific embodiments of the present disclosure and are not intended to limit the present disclosure. Within the spirit and principle of the present disclosure, any modification, equivalent replacement, improvement, etc., shall be included in the protection scope of the present disclosure.

What is claimed is:

1. An acousto-optic Q switch, comprising:
    a transparent optical element configured to form a phase grating and to diffract a laser beam;
    a piezoelectric transducer arranged at one end of the transparent optical element and configured to convert electrical energy into ultrasonic energy to form the phase grating in the transparent optical element;
    an absorber arranged at the other end of the transparent optical element to absorb the ultrasonic energy;
    wherein an incident surface of the transparent optical element is an arc-shaped curved surface and an exit surface of the transparent optical element is an arc-shaped curved surface located on a side of the incident surface; and
    wherein the incident surface is a concave surface and the exit surface is a convex surface such that the laser beam inside the transparent optical element is shaped to be a collimated parallel beam.

2. The acousto-optic Q switch according to claim 1, wherein:
    a curvature of each position of each of the incident surface and the exit surface of the transparent optical element is a constant value or a variable value designed according to a change of the curvature of the incident focused beam.

3. The acousto-optic Q switch according to claim 1, wherein:
    each of the incident surface and the exit surface is implemented as a part of a surface of a sphere having a sphere center;
    a radius of curvature of the incident surface is same as a radius of curvature of the exit surface; and the sphere center of the incident surface and the sphere center of the exit surface are located on a same side.

4. The acousto-optic Q switch according to claim 1, wherein:
material used for the transparent optical element comprises one of fused silica crystal, lithium niobate, lead molybdate, tellurium dioxide, and heavy flint glass.

5. The acousto-optic Q switch according to claim 1, further comprises:
a cooling unit configured to cool the absorber.

6. The acousto-optic Q switch according to claim 5, wherein:
the cooling unit comprises a fan or cooling water.

7. A resonant cavity, comprising:
a laser module configured to generate laser;
a high-reflection mirror reflecting an oscillating laser inside the resonant cavity back to a gain crystal inside the laser module;
the acousto-optic Q switch according to claim 1, which is configured to turn off an oscillation stage laser; and
an output mirror configured to reflect the oscillating laser inside the resonant cavity back to the gain crystal inside the laser module and output a part of the laser.

8. The resonant cavity according to claim 7, wherein:
a transmittance of the output mirror is 10% to 60%;
wherein the acousto-optic Q switch turns off the oscillation stage laser when an included angle between a grating formed in the acousto-optic Q switch and a laser beam is a Bragg angle.

9. A pulse laser device comprising the resonant cavity according to claim 7.

10. A pulse laser device comprising the acousto-optic Q switch according to claim 1.

* * * * *